United States Patent [19]

Tiegs et al.

[11] Patent Number: 4,916,092
[45] Date of Patent: Apr. 10, 1990

[54] CERAMIC COMPOSITES REINFORCED WITH MODIFIED SILICON CARBIDE WHISKERS

[75] Inventors: Terry N. Tiegs, Lenoir City; Terrence B. Lindemer, Oak Ridge, both of Tenn.

[73] Assignee: Martin Marietta Energy Systems, Inc., Oak Ridge, Tenn.

[21] Appl. No.: 152,276

[22] Filed: Feb. 4, 1988

[51] Int. Cl.$^4$ .............................................. C04B 35/80
[52] U.S. Cl. ........................................ 501/89; 501/88; 501/92; 501/91; 501/95; 501/97; 501/103; 501/105; 501/128; 428/368; 428/378
[58] Field of Search ...................... 501/88, 89, 95, 128, 501/92, 91, 103, 105, 107; 428/367, 368, 378, 389

[56] References Cited

U.S. PATENT DOCUMENTS

| | | | |
|---|---|---|---|
| Re. 32,843 | 1/1989 | Wei | 501/89 X |
| 4,194,914 | 3/1980 | Moriya et al. | 501/95 X |
| 4,340,636 | 7/1982 | DeBolt et al. | 428/367 X |
| 4,543,345 | 9/1985 | Wei | 501/95 |
| 4,642,271 | 2/1987 | Rice | 501/95 X |
| 4,652,413 | 3/1987 | Tiegs | 501/95 X |
| 4,657,877 | 4/1987 | Becher et al. | 501/95 X |

FOREIGN PATENT DOCUMENTS

0172082  2/1986  European Pat. Off. .............. 501/95

OTHER PUBLICATIONS

Hawley, *The Condensed Chemical Dictionary*, 1971, pp. 454–455.
"Surface Characterization of Silicon Nitride and Silicon Carbide Powders," by M. N. Rahaman et al., American Ceramic Society Bulletin, vol. 65, No. 8, pp. 1171–1176, (1986).
"Whisker Toughened $Si_3N_4$ composite," by M. Martin et al., Proceedings 24th Auto. Technol. Develop., Contractor Coordination Meeting, p. 197, Oct. 27–30, 1986.
"Fiber-Reinforced SiC Composites with Improved Mechanical Properties," by Anthony J. Caputo et al., American Ceramic Society Bulletin, vol. 66, No. 2, pp. 368–372, (1987).

*Primary Examiner*—Mark L. Bell
*Assistant Examiner*—Karl Group
*Attorney, Agent, or Firm*—James M. Spicer; Bruce M. Winchell

[57] ABSTRACT

Silicon carbide whisker-reinforced ceramic composites are fabricated in a highly reproducible manner by beneficating the surfaces of the silicon carbide whiskers prior to their usage in the ceramic composites. The silicon carbide whiskers which contain considerable concentrations of surface oxides and other impurities which interact with the ceramic composite material to form a chemical bond are significantly reduced so that only a relatively weak chemical bond is formed between the whisker and the ceramic material. Thus, when the whiskers interact with a crack propagating into the composite the crack is diverted or deflected along the whisker-matrix interface due to the weak chemical bonding so as to deter the crack propagation through the composite. The depletion of the oxygen-containing compounds and other impurities on the whisker surfaces and near surface region is effected by heat treating the whiskers in a suitable oxygen spragging atmosphere at elevated temperatures. Additionally, a sedimentation technique may be utilized to remove whiskers which suffer structural and physical anomalies which render them undesirable for use in the composite. Also, a layer of carbon may be provided on the surface of the whiskers to further inhibit chemical bonding of the whiskers to the ceramic composite material.

4 Claims, No Drawings

CERAMIC COMPOSITES REINFORCED WITH MODIFIED SILICON CARBIDE WHISKERS

BACKGROUND OF THE INVENTION

The present invention relates generally to ceramic composites of ceramic matrices reinforced with about 1 to 60 vol. % of elongated monocrystalline silicon carbide whiskers homogeneously dispersed therein, and more particularly to such composites wherein the whiskers are modified or beneficated to provide a relatively uniform whisker size distribution and the surface chemistry is modified to inhibit chemical bonding of the whiskers to the matrix material. This invention was made as a result of work under a contract DE-AC05-840R21400 between Martin Marietta Energy Systems, Inc., and the U.S. Department of Energy.

Recent developments in the strengthening or toughening of ceramic materials for reducing cracking and other deleterious structural problems associated with ceramic materials have enhanced their utilization in ambient temperature as well as high-temperature applications such as in the fabrication of heat engine components, bearings, valves, cutting tools and the like. For example, as described in U.S. Pat. No. 4,543,345 which issued Sept. 24, 1985, ceramic composites have been considerably toughened with respect to cracking by reinforcing the ceramic matrices with elongated monocrystalline silicon carbide whiskers in concentrations of about 10 to 60 vol. %. The ceramic composites are formed by mixing the silicon carbide whiskers with fine ceramic powders such as alumina, mullite, boron carbide, silicon nitride, zirconia, or yttria. These mixtures are blended to provide a homogeneous dispersion of the silicon carbide whiskers therein and are then hot-pressed at temperatures in the range of about 1600° to 1950° C. at pressures in the range of about 28 to 70 MPa for a duration of up to about 2.5 hours to provide SiC whisker-reinforced ceramic composites. The composites are characterized by a significant increase in fracture toughness over that afforded by the matrix material without the inclusion of the silicon carbide whiskers. Alternatively, the silicon carbide whiskers may be blended with the ceramic powders and formed into more intricate shapes than obtainable by hot-pressing by utilizing a pressureless sintering technique as described in U.S. Pat. No. 4,652,413 which issued Mar. 24, 1987. The SiC whiskers may also be incorporated into mullite and alumina matrices toughened with zirconia additions as described in U.S. Pat. No. 4,657,877 which issued Apr. 14, 1987. These patents are incorporated herein by reference.

The silicon carbide whiskers which are homogeneously dispersed within the ceramic matrix material described in the aforementioned patents provide the toughening for the ceramic composite by being contained in the ceramic material with a relatively weak chemical bond at the interface between. Thus, when a SiC whisker-reinforced ceramic composite is subjected to a crack-inducing stress which is sufficient to cause a crack to propagate into the composite, the whiskers effectively act as "reinforcing bars" in that when the crack propagates into the ceramic matrix material and the crack encounters a whisker the weak chemical interface debonds and the crack is forced to change directions and break around the whiskers. The whiskers also "bridge" the crack to deter further crack propagation. Alternatively, if the whisker is excessively chemically bonded to the ceramic matrix material to inhibit "crack-bridging" or whisker pullout, the whiskers will simply break as the crack propagates through the ceramic matrix material since sufficient bonding occurs at the whisker-matrix interface so that the whisker behaves essentially similarly to that of the monolithic ceramic matrix.

Silicon carbide whiskers of essentially a monocrystalline microstructure which are suitable for use in the fabrication of whisker-reinforced ceramic material as described in the aforementioned patents, are presently available from numerous manufacturers in wide variations of size with these whiskers being of a diameter in the range of about 0.1 to about 10 micrometers and a length of about 10 to 200 micrometers. These whiskers have a length to diameter ratio of at least about 10. It has been recently discovered that these commercially available silicon carbide whiskers as supplied by the various manufacturers, are subject to considerable variations in physical and chemical properties with these variations occuring even in batches supplied by the same manufacturer which may adversely affect their utilization for reinforcing ceramic matrices for crack toughening purposes as described above. Further, SiC whiskers, even when of the same dimensions and supplied by the same manufacturer in different lots, have been found to introduce significant differences in the fracture toughness of ceramic composites.

It has been found that these problems are partially due to the fact that each lot or batch of whiskers supplied by any of the various manufacturers contains a considerable percentage of whiskers which have structural anomalies such as holes in the sides, hollow sections, significant diameter variations, length to diameter ratios less than about 10, or defect inclusions, as well as other structural features which detract from the strength of the individual whisker when utilized as a "reinforcing bar" in a ceramic composite. The concentration of the whiskers which are incapable of providing satisfactory ceramic fracture toughening varies from batch-to-batch but is normally in the range of about 1 to 25 wt. % of each batch of whiskers presently provided by the various manufacturers. Included with the defect whiskers is extraneous debris, such as rice hulls and SiC particulates from the whisker manufacturing process, that is associated with the whiskers.

An even more critical problem attendant with the presently supplied SiC whiskers is that the surfaces of the whiskers contain considerable concentrations of impurities of non-silicon carbide metals and compounds which are capable of chemically reacting with the ceramic material forming the matrix for effecting a relatively tenacious chemical bond between the whiskers and the ceramic material. This chemical bonding inhibits the necessary "de-bonding" between the whiskers and the ceramic material needed for providing the whisker crack-bridging, whisker pullout and crack deflecting properties in the ceramic matrix. Of these surface "impurities" it is believed that the most troublesome with respect to providing a chemical bond with the ceramic matrix material are silicon dioxide ($SiO_2$) and calcium oxide (CaO) since these compounds are glass-forming compounds and are usually present in the largest quantities and fuse the whiskers to the ceramic matrix when heated to a temperature greater than about 800° C. which normally occurs during the fabrication of the composites such as described in the aforementioned patents. These glass-forming compounds have been found to be present in significant concentrations on the surface of the whiskers presently provided by all of the commercial suppliers with these concentrations varying from manufacturer to manufacturer and from batch from the same manufacturer. Based upon the analyses of the silicon carbide whiskers presently available from each of the several commercial suppliers, it is expected that silicon dioxide on the surface or near surface regions of the whiskers will be in the order of a silicon dioxide-to-silicon carbide ratio in the range of about 0.1 to 1.0. The concentration of calcium oxide is in the range of about 0.5 to 2 wt. % of the whisker.

In addition to the aforementioned impurities of silicon dioxide and calcium or calcium oxide on the surface or near surface regions of the silicon carbide whiskers it has been found that the commercially available whiskers also contain relatively small concentrations of boron, magnesium, iron, chromium, cobalt, manganese, nickel, sodium, zinc, and copper, and oxide-containing compounds thereof which are also capable of effecting a chemical bonding relationship with the ceramic matrix material during the fabrication of the composites.

The presence of the physical anomalies in each batch of the whiskers and the surface impurities on the surface or near surface regions of commercially available silicon carbide whiskers have been found by applicants to be the primary mechanisms responsible for the production of silicon carbide whisker-reinforced ceramics with heretofore essentially unexplainable large variations in fracture toughness even in similarly produced ceramic composites using the same whisker concentrations, sizes, and supplier. Therefore, it is believed that the manufacturers of silicon carbide whiskers are presently providing commercially available whiskers with large batch-to-batch differences in surface impurities and physical anomalies are apparently unaware of the problems that these impurities and physical anomalies cause in the manufacture and reproducibility of silicon carbide whisker-reinforced ceramic composites.

Some silicon carbide whiskers such as those obtained from rice hulls as described in the aforementioned patents and supplied by ARCO Metals, Silag, Operations, Green, S.C., and whiskers in a larger diameter range of about 0.5 to 5 μm as prepared and supplied by Los Alamos National Laboratory at Los Alamos, N.M., have sometimes been found to possess a layer of free carbon on the surface of the whisker. It has been discovered by applicants that SiC whiskers with a layer of free carbon essentially covering exposed surface portions thereon did not become sufficiently chemically bonded to the matrix material so as to deter desired bridging or deflecting properties of the whiskers. This apparent lack of a "strong" chemical bond between the ceramic matrix material and the whiskers containing the layer of free carbon is believed to occur even if the surface or near regions of the whiskers contain silicon dioxide and/or calcium oxide in such concentrations that would, except for the presence of the layer of free carbon, effect a chemical bond of the whisker to the ceramic matrix sufficient to deter crack bridging. This layer of free carbon is believed to act as a barrier between the aforementioned glass-forming compounds and the ceramic matrix material to inhibit or detract from ceramic bonding reactions between the whisker and the ceramic material. It has also been determined that this layer of free carbon is not purposely provided by the manufacturer on the surface of the SiC whiskers but is merely a by product of the particular whisker manufacturing process since it has been found that the free carbon on the whisker surfaces varies in concentrations or thicknesses from batch-to-batch with some batches of whiskers essentially lacking a layer of free carbon in a sufficient thickness to inhibit excessive chemical bonding of the whiskers to the matrix material due to the presence of the aforementioned surface impurities on the whiskers.

SUMMARY OF THE INVENTION

The chemistry of the surface and near surface regions of the silicon carbide whiskers such as described above lead to the formation of SiC whisker-reinforced ceramics which possess a wide range of fracture toughness even when fabricated from whiskers of essentially the same dimensions and concentrations. In view of the problems associated with these whiskers, it is a primary objective or aim of the present invention to provide SiC whiskers with a modified or beneficated surface chemistry which will effectively minimize chemical bonding of the whiskers to the ceramic matrix and facilitate the fabrication of SiC carbide whisker-reinforced ceramic composites of essentially uniform fracture toughness independent of the whisker manufacturer or whisker lot.

Another aim or objective of the present invention is to provide silicon carbide whisker-reinforced ceramic composites in which the whisker surfaces or near surface regions have been beneficated or modified to provide a silicon dioxide-to-silicon carbide ratio of less than 0.1 and a calcium oxide concentration of less than about 1.5 wt. % so that only relatively weak chemical bond due to these glass-forming compounds will occur at the silicon carbide whisker-ceramic matrix material interface to assure the occurrence of the desired crack bridging, whisker pullout and crack deflection.

A still further object of the present invention is to provide for the surface benefication of elongated essentially monocrystalline silicon carbide whiskers which are of a diameter in the range of about 0.1 to about 10 μm and with a length to diameter greater than about 10. Whiskers selected from this range are subjected to an oxygen reducing atmosphere at an elevated temperature for sufficiently depleting the surface and near surface regions of the whiskers of metallic and oxygen-containing compounds to provide only a minimal level of chemical bonding of the whiskers to the ceramic material in a ceramic composite which will assure crack bridging, whisker pullout and crack deflection of the ceramic matrix material about the whiskers when the whiskers are contacted by a crack propagating into the ceramic composite.

A still further object of the present invention is to provide for the bulk chemical benefication of elongated essentially monocrystalline silicon carbide whiskers which are of a diameter in the range of about 0.1 to about 10 μm and with a length to diameter ratio greater than about 10 by subjecting whiskers selected from said range to an elevated temperature atmosphere for significantly reducing from the whiskers their levels of metallic and oxygen-containing compounds.

A further objective of the present invention is to provide a benefication of the silicon carbide whiskers before they are utilized in a silicon carbide whisker-reinforced ceramic composite in order to remove whiskers having physical anomalies and other extraneous debris resulting from the whisker manufacturing process, which would detract from the expected fracture toughness of the ceramic composite.

A still further objective of the present invention is to provide silicon carbide whiskers in the aforementioned size range with a layer of free carbon over essentially the entire exposed surface of the whiskers at a thickness in the order of about 1 to 100 angstroms so as to inhibit chemical bonding between the silicon carbide whiskers and the ceramic matrix material. Preferably, this layer of free carbon is provided on whiskers which have been previously heat treated to reduce the presence of chemical bond-producing impurities on the silicon carbide whiskers as described above but can be placed on whiskers which contain significant concentrations of the surface impurities.

Other and further objects of the invention will be obvious upon an understanding of the illustrative embodiments and method about to be described or will be indicated in the appended claims and various advantages not referred to herein will occur to one skilled in the art upon employment of the invention in practice.

DETAILED DESCRIPTION OF THE INVENTION

As generally described above, silicon carbide whisker-reinforced composites have high fracture toughness and strength at ambient temperatures and at elevated temperatures and are of considerable value as structural materials for the fabrication of various structures and components utilized in high-temperature and abrasive environments. The fracture toughness of these ceramic composites is due to crack interaction with homogeneously dispersed monocrystalline silicon carbide whiskers in the ceramic matrix in that the crack propagation is impeded at the interface of the whiskers and ceramic by mechanisms such as crack pinning, crack deflection, crack bridging and whisker pullout. These mechanisms rely heavily upon the level of chemical bonding occurring between the whisker and the ceramic matrix in that the bond must be sufficiently weak so that as the crack propagates in the ceramic matrix composite, its progress is impedded at the whisker-matrix interface.

The fabrication of silicon carbide whisker-reinforced ceramic composites may be achieved as described in the aforementioned patents. In addition, the surface modified whiskers would also improve the strength and toughness of other ceramic composites, where the matrix materials are formed of silicon nitride, zirconia, yttria, sialons, metals or plastics. The chemical bonding of the whiskers occurs with the ceramic matrix material due to the chemical interaction between non-silicon carbide materials on the whisker surface or near surface regions of the whisker with the matrix material at high temperatures in the range of about 800° to 1850° C. which are utilized for the fabrication of the whisker-reinforced composites. It is the primary objective, as pointed out above, to alter or modify the chemical bonding mechanism between the whisker and the matrix material so as to establish a sufficiently weak bond to provide for the impediment crack propagation as afforded by the aforementioned mechanisms in whisker-reinforced ceramics.

The silicon carbide whiskers commercially available are in a size range of about 0.1 $\mu$m up to about 10 $\mu$m. These whiskers have an essentially monocrystalline microstructure to obviate cracking planes from occurring at the grain boundaries when contacted by a crack propagating into the ceramic matrices and are of lengths in the range of about 10 to 200 $\mu$m for the small diameter whiskers and up to about 50 to 200 $\mu$m for the larger diameter whiskers. In order for the whiskers to function satisfactorily in the whisker-reinforced composites they should have a length to diameter ratio of at least about 10.

As noted above, the SiC whiskers from the various suppliers have resulted in the manufacture of whisker-reinforced ceramics with wide variations in fracture toughness. An investigation of the mechanisms responsible for these discrepancies or differences in the fracture toughness provided by the whiskers utilized in similar manufacturing techniques have shown that the whisker surfaces are contaminated with a considerable quantity of "impurities" which are instrumental in the chemical interaction with the ceramic matrix material to provide a chemical bonding reaction with the matrix material. As noted above, the whiskers have surfaces and near surface regions containing considerable quantities of glass-forming compounds most notably silicon dioxide and calcium (most likely as calcium oxide. These compounds form a glassy bond with the matrix material at the composite fabricating temperatures.

The various commercially available whiskers studied for the presence of surface contaminants have shown that the silicon dioxide is present in a silicon dioxide-to-silicon carbide ratio in the order of about 0.1 to 1. Similarly the concentration of calcium and calcium oxide is in the range of about 0.5 to 2 wt. %. It has been found that a concentration of calcium oxide greater than about 1.5 wt. % is sufficiently large to promote deleterious chemical bonding at the whisker-matrix interface. Thus, as will be described in detail below, these whiskers when heat treated in accordance with present invention have surfaces and near surface regions thereof sufficiently modified so as to have a silicon dioxide-to-silicon carbide ratio reduced to a ratio of less than 0.1 and a calcium oxide concentration of less than about 1.5 wt. %. It is believed that this concentration of the glass-forming materials on the whiskers when the whiskers are beneficated in accordance with the present invention will inhibit the formation of an excessive chemical bond between the whiskers and the ceramic matrix which will encourage the occurrence of the desired crack bridging, whisker pullout, crack deflection and other crack-interrupting features provided by the silicon carbide whiskers as described above. The concentration of silicon dioxide and calcium oxide on the whisker surface and near surface regions can both be, and are preferably, reduced to zero by the employment of the present invention. However, satisfactory results may be achieved by utilizing a silicon dioxide-to-silicon carbide ratio of less than 0.1 and a calcium oxide concentration of less than 1.5 wt. %. Other metals and non-silicon carbide compounds also present on the surface and near surface regions are also depleted by employing the present invention to further inhibit chemical bonding between these whisker "impurities" and the ceramic matrix.

In the practice of the present invention the silicon carbide whiskers are heat treated in an oxygen sparaging atmosphere at elevated temperatures sufficient to deplete or reduce the oxygen-containing and other non-silicon carbide compounds and metals on the surface and near surface regions of the whisker. More specifically, this method of whisker benefication comprises the steps of subjecting the whiskers prior to the dispersion thereof in the ceramic matrix to one of an atmosphere or a combination of atmospheres provided by reducing the ambient pressure to a pressure less than atmospheric pressure, an atmosphere of inert gas, an atmosphere of a reactive gas, or mixtures such atmospheres, and then heating the whiskers while subjected to one or more of these atmospheres to a temperature in the range of about 800° to 1850° C. This temperature and atmosphere(s) is maintained for a duration sufficient to effect the reduction of non-silicon carbide materials on the exposed surfaces which contribute to the bonding of the whiskers to the matrix material. Normally, a duration of about 0.5 to 2 hours is sufficient to reduce the impurities to acceptable levels. With relatively large batch sizes longer holding times may be required.

By heat treating the silicon carbide whiskers in accordance with the present invention the concentrations of silicon dioxides and calcium oxides on the whiskers are significantly reduced. Also, surface impurities on the whiskers such as the metals, boron, magnesium, iron, chromium, cobalt, manganese, nickel, sodium, zinc, and copper, and compounds thereof are considerably reduced. This method is significant in modifying whiskers with various surface chemistries to provide whiskers with an essentially similar surface chemistry so that reproducibility of whiskerreinforced composites of similar fracture toughness may be more readily achieved.

The aforementioned atmosphere of inert gas may be provided by employing argon, helium, neon, or a combination thereof at pressures in the range of about atmospheric down to about 0.01 torr. A stream of the inert gases may be flowed through a batch of the whiskers to carry off volatilization products while the whiskers are being sufficiently heated to volatilize the metals and oxygen-containing compounds on the whisker surfaces.

The atmosphere provided by the reactive gases which can be a combination of reactive gases such as hydrogen, carbon monoxide, mixtures thereof, or a mixture with nitrogen or an inert gas. These reactive gases and mixtures provide for the reactions at the surface of the whisker which convert the silicon dioxide and calcium oxide to nonoxygen-containing compounds which are ineffective for establishing a chemical bond with the ceramic matrix material. In the reactions described below the compound or material in brackets is in solid phase while the compound or material in the parentheses is in a gaseous or liquid phase.

Hydrogen may be utilized to remove silicon dioxide by the reaction $[SiO_2]+(H_2)\rightarrow(H_2O)+(SiO)$. The hydrogen also acts to increase the reaction rates and can be used in combination with nitrogen to beneficially transport solid carbon via the formation of gaseous HCN by the reaction of $2[C]+(H_2)+(N_2)\rightarrow 2(HCN)$. The hydrogen can also be successively combined in minor percentages with the argon or other inert atmospheres to cleanse the whisker surface of the chemical bond-forming contaminants.

Use of hydrogen atmospheres can also lead to free carbon depletion at the whisker surfaces to form hydrocarbons by the following and similar reactions: $C+2H_2\rightarrow CH_4$, $2C+3H_2\rightarrow C_2H_2$, ... Other research has shown silicon oxide and carbon removal from SiC powder with gas mixtures of argon-5% $H_2$ at temperatures of $\leq 1300°$ C. The removal of surface carbon has been found by the present inventors to be inhibited by the use of high temperatures greater than 1300° C. and/or the use of a heat-treatment in a furnace with graphite or carbon parts, such as treating elements and crucibles. At high temperatures, the equilibrium stability of the hydrocarbons is reduced and thus carbon removable if reduced. The use of graphite or carbon furnace parts results in the formation of a hydrocarbon saturated atmosphere, thus reducing further carbon removal. The same effect could be produced by addition of a small quantity of hydrocarbon gas with the whisker surface carbon.

Carbon Monoxide can be used to beneficiate SiC surfaces in that the carbon monoxide assists in the removal of silicon dioxide by the reaction $[SiO_2]+[C]\rightarrow(SiO)+(CO)$. While this reaction removes some beneficial carbon the silicon dioxide removal is of more importance. Carbon concentrations on the surface of the whiskers can be restored by employing a further feature of the present invention as set forth below.

The utilization of the atmosphere of reduce pressure, i.e., a vacuum in the range of about less than 0.9 torr, is of particular usefulness in removing surface contaminants volatile at the temperatures employed for whisker benefication as described above. Vacuum promotes the reaction: $[SiO_2]+3[C]\rightarrow[SiC]3 2(CO)$ within the temperature range of about 800° to 1800° C. Vacuum also promotes the depletion of calcium oxide by volatilization of Ca-rich gaseous species. Other surface impurities are reduced by similar mechanisms. It is also believed that another reaction present for removing the silicon dioxide is the conversion of $[SiO_2]\rightarrow(SiO)+0.5(O_2)$ which gaseous products are withdrawn by the vacuum system.

The near surface region of many commercially available SiC whiskers are not pure SiC, or $SiO_2$, but as silicon oxycarbides (Si-O-C). The heat-treatments in accordance with the present invention have been found to result in the increase in free surface carbon by the reaction Si—O—C→(SiO)+C, where the (SiO) is removed in the gas phase.

The Table 1 below sets forth results of heat treating as-received silicon carbide whiskers from a supplier and the effects on the surface chemistry of the whiskers by heat treatment in various atmospheres and the resulting fracture toughness of the composite produced from the heat treated whiskers. The composites are formed of alumina as the matrix material with 20 vol. % silicon carbide whiskers. Further examples of composite property improvements for alumina-$ZrO_2$ composites are shown in Table 2.

TABLE 1

| Treatment Atmosphere | Temp. (°C.) | Pressure (Torr, atm.) | Surface Chemistry | | | Composite Fracture Toughness $K_{Ic}$ (MPa m) | Composite Flexural Strength (MPa) |
| --- | --- | --- | --- | --- | --- | --- | --- |
| | | | SiO/SiC | C/SiC | CaO Content (wt. %) | | |
| None: | | | | | | | |
| As-received | — | — | 0.11 | 0.64 | 1.8 | 3.9 | 355 |
| Argon | 1450 | 760,1 | 0.08 | 3.57 | 0.4 | 4.9 | 440 |

TABLE 1-continued

| | | | Surface Chemistry | | | | |
|---|---|---|---|---|---|---|---|
| Treatment Atmosphere | Temp. (°C.) | Pressure (Torr, atm.) | SiO/SiC | C/SiC | CaO Content (wt. %) | Composite Fracture Toughness $K_{Ic}$ (MPa m) | Composite Flexural Strength (MPa) |
| Argon-4%H$_2$ | 1450 | 760,1 | 0 | 1.47 | 0 | 5.0 | 430 |
| CO | 1450 | 76,0.1 | 0.01 | 1.75 | 1.4 | 5.5 | 455 |
| CO | 1250 | 76,0.1 | 0.01 | 1.16 | 0.6 | 5.0 | 420 |
| CO | 1450 | 530,0.7 | 0.02 | 1.00 | trace | 5.2 | 470 |
| Vacuum | 1450 | $< \times 10^{-3}, 1 \times 0^{-6}$ | 0 | 1.82 | 0 | 5.9 | 485 |
| ¾H$_2$-¼N$_2$ | 1450 | 760,1 | 0.05 | 1.04 | trace | 4.4 | 400 |
| ¾H$_2$-¼N$_2$ | 1000 | 760,1 | 0.07 | 2.70 | trace | 4.3 | 460 |

TABLE 2

Effect of Whisker Surface Treatment on Properties of Al$_2$O$_3$ with 5v/o ZrO$_2$ and 20v/o SiC Whisker Composites

| Treatment | Composite Fracture Toughness, KIc | Composite Flexural Strength |
|---|---|---|
| None: As-Received | 5.1 MParm | 535 MPa |
| Ar-4% H$_2$/1450° C.* | 6.1 MParm | 590 MPa |

*Surface chemistry of whiskers is same as that described in TABLE 1.

A further benefit of the heat-treatment of the present invention is the reduction of the bulk impurities in SiC whiskers that are relatively unpure. An example is shown in Table 3. Ceramic matrix composites of alumina with 20 vol. % SiC whiskers when fabricated with these whiskers showed significantly improvement for the treated whiskers as shown in Table 4.

TABLE 3

Bulk Chemical Analysis of SiC Whiskers (ppm)

| Element | As-Received | Heat-Treated* |
|---|---|---|
| B | >1000 | 200 |
| Ca | 400 | 200 |
| Cr | 50 | 3 |
| Fe | 200 | 5 |
| K | 100 | 10 |
| Mg | 100 | 10 |
| Mn | 3 | 1 |
| Na | 100 | 10 |
| Ni | 20 | 3 |
| Zn | 5 | <3 |
| Cu | 3 | 1 |

*1450° C. for one hour at pressure of less than $1 \times 10^{-3}$ torr.

TABLE 4

Effect of Reducing SiC Whisker Bulk Impurities on Properties of Alumina - 20 vol. % SiC Whisker Composites

| Whisker Treatment | Composite Fracture Toughness, KIc | Composite Flexural Strength |
|---|---|---|
| None: As-Received | 5.8 | 410 |
| 1450° C./Vacuum | 6.5 | 450 |

In addition to the heat treatment of the present invention uniformity in the fabrication of the SiC whisker-reinforced composites is further provided by another whisker benefication feature of the invention. Batches or lots of silicon carbide whiskers from the various suppliers contain whiskers with various physical anomalies as briefly described above which considerably detract from using such whiskers in the whiskerreinforced ceramic components. It has been found by the present inventors that about 1 to 25 wt. % of a typical batch of whiskers received from a typical supplier contains whiskers which are not satisfactory for use in the manufacture of whisker-reinforced ceramics due to physical anomalies of these whiskers. In addition, extraneous debris, such as rice hulls and SiC particulates from the whisker manufacturing process, can be found associated with the whiskers. A considerable percentage of these "undesirable" whiskers and extraneous debris may be readily removed by practicing a simple flotation or sedimentation procedure wherein the as-received whiskers are placed in a container of liquid, i.e., water, and allowed to settle over a period of about 8 hours. It has been found that the whiskers settling to the bottom of the container are of sufficient similar physical characteristics so as to provide satisfactory utilization as structural reinforcement in the ceramic composites whereas the remaining whiskers which are floating on the surface of the water or at some stage of submersion within the water not of sufficient physical strength or dimensions to permit their satisfactory use in a whisker-reinforced composite. These undesirable whiskers may be readily decanted or otherwise removed from the vessel so that essentially only the acceptable whiskers remain. An example of the composite property improvement observed by practicing this procedure is described in the Example set forth below.

EXAMPLE

Tateho SCW-15 SiC whiskers manufactured by Tateho Chemical Co., Ako, Japan, have been shown to include defective whiskers having holes in their central core. The presence of the hole naturally makes these a weaker whisker than a defect-free whisker. Because the whiskers are put under stress during crack propagation, a strong whisker is desirable. The defect whiskers were removed by simple sedimentation in water at a solids loading of 1 to 2 vol. %. About 15% of the lowest density material was removed. Alumina with 20v/o SiC whisker composites were fabricated like examples in Table 1, using as-received and beneficiated whiskers. Composite toughness and strength were improved.

| Whiskers | Flexural Strength | Fracture Toughness, KIc MPa rm |
|---|---|---|
| As-Received | 355 | 3.9 |
| Beneficiated | 540 | 5.1 |

Very few defect whiskers could be observed on fracture surfaces of beneficiated whisker composites.

An even further feature of the present invention is that in addition to the surface benefication provided by the aforementioned heat treatment, the whiskers, as heat-treated or as received from the manufacturer and preferably after undergoing the above flotation step, may be provided with a layer of free carbon. This layer which is preferably of a thickness in the range of about 1 to 100 angstroms is sufficient to inhibit excessive or deleterious chemical bonding at the interface of the silicon carbide whisker and the ceramic matrix. This layer of free carbon may be readily provided on the surface of the whisker by enclosing the whiskers in a suitable vessel and subjecting the whiskers to a gaseous hydrocarbon atmosphere such as natural gas, $CH_4$ or $C_2H_6$ and the like which will chemically react or decompose at elevated temperatures. In typical reactions, the hydrocarbon gas is flowed through the whiskers while at a temperature of 1300° to 1700° C. to convert the gas to carbon plus hydrogen with the carbon depositing as a layer of free carbon on the surface of the whiskers. This layer of free carbon is preferably used on whiskers which have been treated in accordance with the present invention to even further assure the presence of whisker surface conditions which not contribute to deleterious chemical bonding between the whiskers and the ceramic composite.

In addition to the use of a hydrocarbon atmosphere for providing free carbon on the whisker surface some benefits derived by the presence of the free carbon can also be achieved by using other gaseous atmospheres which react with SiC to provide free carbon. For example, nitrogen could be used to partially convert the silicon carbide whisker surface to silicon nitride and free carbon so as to provide a portion of free carbon on the whisker surface. In the reaction with nitrogen and the SiC on the surface of the whiskers the reaction is as follows: $3[SiC] + 2(N_2) \rightarrow [SiC_3N_4] + 3[C]$. The nitrogen may also ge into solution in the solid surface region of the silicon carbide a few atomic percent. But the advantage or disadvantage of such a solution is not presently known.

Another possible method for producing a carbon-rich surface would be to attach a polymeric carbon precursor, such as polyvinyl pyrrolidone, to the surface in liquid slurry. The slurry would be dried, and then the polymer would be decomposed in the inert atmosphere at temperature greater than 500 C.

It will be seen that the present invention provides for beneficating the surface of silicon carbide whiskers utilized for the structural reinforcement of ceramic materials in such a manner as to assure that the crack behavior at the whisker matrix interface is such that the whiskers will provide the desired crack bridging and deflection and to facilitate the fabrication of whisker-reinforced ceramics of high-level fracture toughness is a reproducible manner not heretofore achievable.

We claim:

1. A ceramic composite comprising a ceramic matrix having elongated monocrystalline silicon carbide whiskers homogeneously dispersed therein with said whiskers being retained in said matrix with an insufficient bond at a matrix-whisker interface to promote debonding along said whisker-matrix interface when a crack propagating into said ceramic composite contacts said whiskers thereby providing bridging and deflection of said crack by said whiskers when said ceramic composite is subjected to sufficient stress to effect propagation of said crack therein, said whiskers having a surface characterized by a silicon dioxide-to-silicon carbide ratio of less than 0.1, a concentration of calcium oxide less than about 1.5 wt. %, and a coating of free carbon on said surface of about 1-100 angstroms.

2. The ceramic composite claimed in claim 1, wherein said whiskers are in a size range having a diameter in the range of about 0.1 to 10 μm and a length-to-diameter ratio greater than about 10.

3. The ceramic composite as claimed in claim 1, wherein said ceramic matrix is selected from the group consisting of alumina, boron carbide, silicon nitride, sialons, mullite, zirconia, alumina-zirconia and yttria.

4. A ceramic composite comprising a ceramic matrix having elongated monocrystalline silicon carbide whiskers homogeneously dispersed therein, said whiskers having a diameter in the range of about 0.1 to 10 μm and a length to diameter ratio greater than about 10, said whiskers having a surface characterized by a silicon dioxide-to-silicon carbide ratio of less than 0.1, a concentration of calcium oxide less than about 1.5 wt. %, and a coating of free carbon on said surface of about 1-100 angstroms.

* * * * *